US011897274B2

(12) United States Patent
Umakoshi et al.

(10) Patent No.: US 11,897,274 B2
(45) Date of Patent: Feb. 13, 2024

(54) PRINTING APPARATUS AND HEAD MAINTENANCE METHOD IN PRINTING APPARATUS

(71) Applicant: SCREEN HOLDINGS CO., LTD., Kyoto (JP)

(72) Inventors: Shoichi Umakoshi, Kyoto (JP); Kazuhiko Asada, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 17/668,779

(22) Filed: Feb. 10, 2022

(65) Prior Publication Data

US 2022/0258503 A1 Aug. 18, 2022

(30) Foreign Application Priority Data

Feb. 17, 2021 (JP) ................................ 2021-023141

(51) Int. Cl.
*B41J 25/34* (2006.01)
*B41J 2/15* (2006.01)
*B41J 2/23* (2006.01)

(52) U.S. Cl.
CPC .................................... *B41J 25/34* (2013.01)

(58) Field of Classification Search
CPC ... B41J 25/34; B41J 2/155; B41J 2/245; B41J 2/235
See application file for complete search history.

(56) References Cited

U.S. PATENT DOCUMENTS

2017/0341423 A1 11/2017 Schnepp
2020/0247154 A1* 8/2020 Sekikawa ................ B41J 29/13

FOREIGN PATENT DOCUMENTS

JP 2017-177362 A 10/2017
WO 2015/019795 A1 2/2015
WO 2020/051067 A1 3/2020

OTHER PUBLICATIONS

Extended European Search Report issued in corresponding European Patent Application No. 22156779.5-1014, dated Jul. 7, 2022.

* cited by examiner

*Primary Examiner* — Jason S Uhlenhake
(74) *Attorney, Agent, or Firm* — Rimon, P.C.

(57) ABSTRACT

In the invention, pipes and the like are guided in parallel to a second horizontal direction according to collective movements of printing bar units while being stored and protected by a protecting/guiding member arranged outside and adjacent to a body frame. In this way, breakage of the pipes and the like during the collective movements of printing bar units is reliably prevented. Moreover, the pipes and the like stored in the protecting/guiding member move outside the body frame and are not present inside the body frame. As a result, a work space can be secured without being limited by the collective movements of the printing bar units to the maintenance space.

5 Claims, 5 Drawing Sheets

PRINTING APPARATUS AND HEAD MAINTENANCE METHOD IN PRINTING APPARATUS

CROSS REFERENCE TO RELATED APPLICATION

The disclosure of Japanese Patent Application No. 2021-023141 filed on Feb. 17, 2021 including specification, drawings and claims is incorporated herein by reference in its entirety.

BACKGROUND OF THE INVENTION

1. Field of Invention

This invention relates to a printing apparatus for printing an image by discharging inks different from each other to a printing medium from a plurality of printing bar units arrayed adjacently and a method for maintaining the printing bar units in the printing apparatus.

2. Description of the Related Art

A printing apparatus is known which prints an image on the upper surface of a printing medium by discharging a water-based or oil-based ink or the like to the printing medium by an inkjet method from discharge heads provided in a printing bar unit. For example, in a printing apparatus described in JP 2017-177362A, a plurality of printing bar units are arrayed along a conveying direction of a printing medium. In the printing bar unit, discharge heads discharge an ink in the form of liquid droplets to the upper surface of the printing medium from nozzle surfaces thereof. Thus, if deposits adhering to the nozzle surfaces are dried and fixed, the clogging of nozzles occurs, leading to a reduction in printing performance. To solve such a problem, a maintenance processing such as flushing or purging is automatically performed by a maintenance unit. However, complete automation is difficult at present and an operator may directly access the nozzle surfaces for the visual confirmation of the nozzle surfaces or manual head suction. Accordingly, in the above printing apparatus, a work space for allowing the operator to access the nozzle surfaces by moving the maintenance unit is secured.

SUMMARY OF THE INVENTION

In the printing apparatus described in JP 2017-177362A, a movement of the maintenance unit is necessary to create the work space. Further, in the printing apparatus, many components such as ink pipes for supplying the inks to the printing bar units and wires for controlling ink discharge by the discharge heads are connected to the printing bar units. Thus, in creating the work space, interference with the ink pipes and the like has to be avoided. However, the layouts of a piping system and a wiring system are not considered at all in JP 2017-177362A.

This invention was developed in view of the above problem and aims to easily and reliably secure a work space for allowing an operator to access printing bar units in a printing apparatus for printing an image by discharging inks different from each other to a printing medium from a plurality of the printing bar units arrayed adjacently.

A first aspect of the invention is a printing apparatus comprising: a first printing bar unit configured to discharge a first ink supplied via a first ink pipe to a printing medium being conveyed in a first horizontal direction by operating based on an electrical signal fed via a first wire; a second printing bar unit arranged adjacent to the first printing bar unit in a direction parallel to the first horizontal direction and configured to discharge a second ink supplied via a second ink pipe to the printing medium by operating based on an electrical signal fed via a second wire; a body frame, having a frame body structure extending to a maintenance space separated from a printing space above the printing medium in a second horizontal direction different from the first horizontal direction, configured to support the first and second printing bar units collectively movably between the printing space and the maintenance space; and a protecting/guiding member for guiding the first wire and the first ink pipe connected to the first printing bar unit and the second wire and the second ink pipe connected to the second printing bar unit in parallel to the second horizontal direction according to movements of the first and second printing bar units while storing and protecting the first and second wires and the first and second ink pipes in a storage space, the protecting/guiding member being arranged outside and adjacent to the body frame, whereby a work space is formed below the first and second printing bar units located in the maintenance space inside the body frame and first and second printing bar units are accessible through the work space.

A second aspect of the invention is a head maintenance method in the printing apparatus, the method comprising: collectively moving the first and second printing bar units to the maintenance space; and performing a maintenance operation by accessing at least one of the first and second printing bar units through the work space formed below the first and second printing bar units located in the maintenance space.

In the invention thus configured, the pipes and the wires are connected to each printing bar unit. Those printing bar units arranged adjacent to each other are collectively moved in parallel to the second horizontal direction. Accordingly, the pipes and the wires also move according to the movements of the printing bar units to the maintenance space. However, depending on a layout state of the pipes and the wires, not only the pipes and the like may be broken during the movements, but also the work space may be limited by the presence of the pipes and the like. Accordingly, in the invention, the pipes and the like are guided in parallel to the second horizontal direction according to the collective movements of the printing bar units while being stored and protected by the protecting/guiding member arranged outside and adjacent to the body frame. In this way, the breakage of the pipes and the like during the collective movements of the printing bar units is reliably prevented. Moreover, the pipes and the like stored in the protecting/guiding member move outside the body frame and are not present inside the body frame. As a result, the work space can be secured without being limited by the collective movements of printing bar units to the maintenance space.

As described above, according to the invention, a work space for allowing an operator to access discharge heads can be easily and reliably secured in a printing apparatus for printing an image by discharging inks different from each other to a printing medium from a plurality of printing bar units arrayed adjacently.

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one independent form of the invention in order to solve some or all of the aforementioned problems or to achieve some or all of the effects described in this specification.

DETAILED DESCRIPTION OF THE PREFERRED EMBODIMENTS

Figure 1:
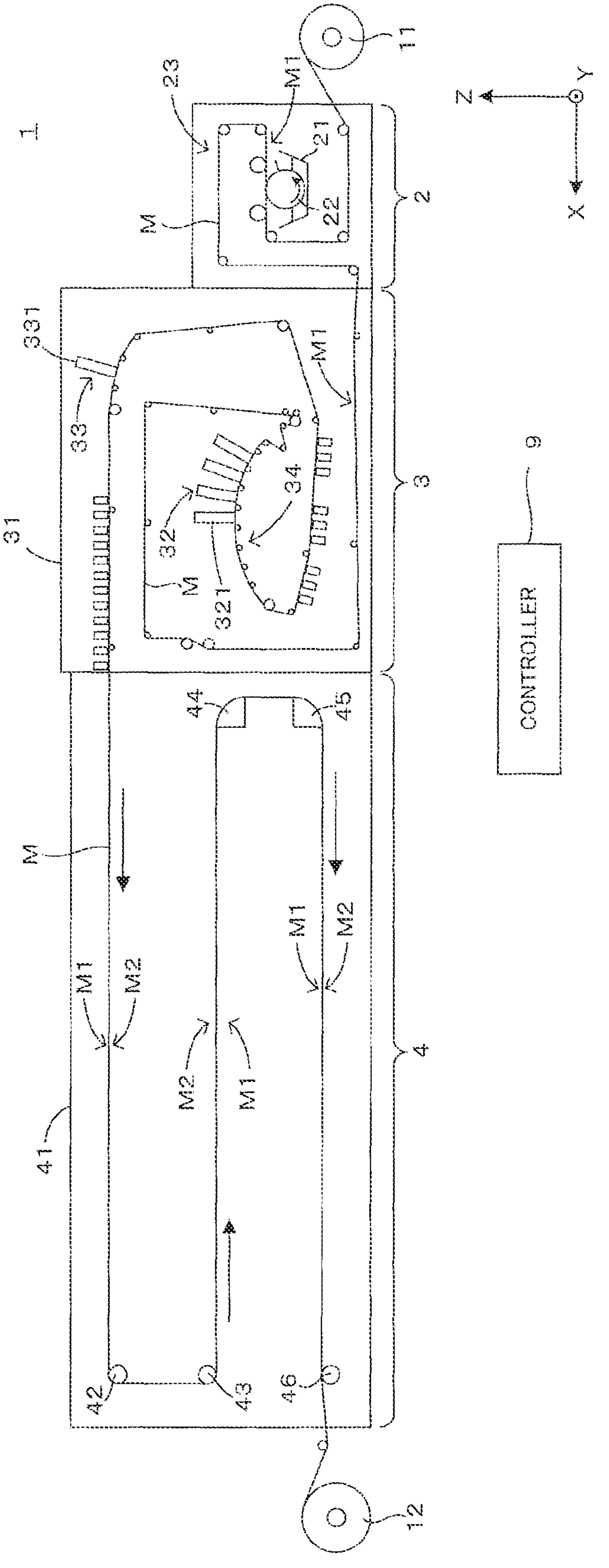
FIG. 1 is a front view schematically showing an example of a printing system equipped with one embodiment of a printing apparatus according to the invention.

FIG. 1 is a front view schematically showing an example of a printing system equipped with one embodiment of a printing apparatus according to the invention. In FIG. 1 and subsequent figures, a horizontal direction in which a coating apparatus 2, a printing apparatus 3 and a drying apparatus 4 constituting a printing system 1 are arranged is referred to as an "X direction", a horizontal direction from a right side toward a left side of FIG. 1 is referred to as a "+X direction" and an opposite direction is referred to as a "−X direction" to clarify an arrangement relationship of each component of the apparatus. Further, out of horizontal directions Y orthogonal to the X direction, a direction forward of the apparatuses is referred to as a "+Y direction" and a direction backward of the apparatuses is referred to as a "−Y direction". Further, upward and downward directions along a vertical direction Z are respectively referred to as a "+Z direction" and a "−Z direction".

This printing system 1 applies a coating process, a printing process and a drying process to a printing medium M while conveying the printing medium M in the form of a long strip from a feeding roll 11 to a winding roll 12 in a roll-to-roll manner by controlling each component of the apparatuses by a controller 9. That is, the coating apparatus 2 applies a coating liquid to the printing medium M. Then, the printing apparatus 3 prints an image by causing various inks to adhere to the printing medium M in an ink-jet method. Further, the drying apparatus 4 dries the inks adhering to the printing medium M. Note that a material of the printing medium M is a film made of OPP (oriented polypropylene), PET (polyethylene terephthalate) or the like. However, the material of the printing medium M is not limited to the film and may be paper or the like. Such a printing medium M is flexible. Further, out of both surfaces of the printing medium M, the surface on which images are to be printed is referred to as a front surface M1 and the surface opposite to the front surface M1 is referred to as a back surface M2 as appropriate.

The coating apparatus 2 includes a pan 21 storing a liquid primer (coating liquid), a gravure roller 22 partially immersed in the primer stored in the pan 21 and a conveying unit 23 conveying the printing medium M. In the coating apparatus 2, a coating region is provided where the gravure roller 22 contacts the printing medium M conveyed by the conveying unit 23 from below, and the conveying unit 23 conveys the printing medium M along the coating region with the front surface M1 of the printing medium M facing down. On the other hand, the gravure roller 22 supplies the primer to the coating region by rotating while holding the primer on the peripheral surface thereof. In this way, the primer supplied by the gravure roller 22 is applied to the front surface M1 of the printing medium M in the coating region. Further, in the coating region, a moving direction of the printing medium M and a rotating direction of the peripheral surface of the gravure roller 22 are opposite. That is, the primer is applied to the printing medium M by a reverse kiss method. Then, the conveying unit 23 carries out the printing medium M from the coating apparatus 2 to the printing apparatus 3 with the front surface M1 of the printing medium M having the primer applied thereto facing up.

The printing apparatus 3 includes a housing 31, a color printing unit 32 arranged in the housing 31, a white printing unit 33 arranged above the color printing unit 32 in the housing 31, and a conveying unit 34 conveying the printing medium M by a plurality of rollers arranged in the housing 31.

The color printing unit 32 includes a plurality of (four) printing bar units 321 arrayed in the moving direction (direction from the other side X2 toward the one side X1) of the printing medium M above the printing medium M conveyed by the conveying unit 34. The plurality of printing bar units 321 include nozzles facing the front surface M1 of the printing medium M passing therebelow from above, and discharge color inks of mutually different colors from the nozzles by the ink-jet method. Here, the color inks mean inks other than a white ink and include inks of cyan, magenta, yellow, black and the like. In this way, the plurality of printing bar units 321 of the color printing unit 32 print a color image on the front surface M1 of the printing medium M by discharging the color inks to the front surface M1 of the printing medium M passing therebelow from above.

Further, the white printer 33 includes a single printing bar unit 331 arranged above the printing medium M conveyed by the conveyor 34. The printing bar unit 331 includes nozzles facing the front surface M1 of the printing medium M passing therebelow and discharges a white ink from the nozzles by an inkjet method. In this way, the printing bar unit 331 of the white printer 33 prints a white image on the front surface M1 of the printing medium M by discharging the white ink to the front surface M1 of the printing medium M passing therebelow from above.

Note that, although not shown in FIG. 1, two types of dryers are provided in the housing 31 of the printing apparatus 3. One dryer is a pre-dryer for drying the color inks adhered to the surface M1 of the printing medium M by the color printer 32. The other dryer is an upper dryer for drying the white ink adhered to the surface M1 of the printing medium M by the white printer 33.

Further, the color printer 32 and the white printer 33 discharge the inks from nozzle surfaces in the ink-jet method. Thus, if a printing process is performed for a long time, discharge failures of the nozzles gradually occur.

Further, when printing is temporarily stopped, the inks adhering to the nozzle surfaces may be solidified to cause a discharge failure. Accordingly, a color maintenance part (35 in FIG. 6 to be described later) corresponding to the color printer 32 is provided. The color maintenance part is separated from the printing bar units 321 in the horizontal direction Y during normal printing. When the printing bar units 321 require maintenance, the color maintenance part moves to a position right below the printing bar units 321 to perform various types of maintenance. Then, the color maintenance part is separated from the printing bar units 321 in the horizontal direction Y after the end of the maintenance. These points similarly apply also to the white printer 33. That is, a white maintenance part (not shown) corresponding to the white printer 33 is provided away from the printing bar unit 331 in the horizontal direction Y. During maintenance, the white maintenance part moves to a position right below the printing bar unit 331 to perform various types of maintenance and is, thereafter, separated from the printing bar unit 331 in the horizontal direction Y.

Further, as described in JP 2017-177362A, an operator may operate the nozzle surfaces of the printing bar units 321, 331 by directly accessing these. Thus, in the printing apparatus 3, the color printer 32 and the white printer 33 are movable in the horizontal direction Y. When an access of the operator becomes necessary, the color printer 32 and the white printer 33 are moved to a maintenance space separated from printing positions in the horizontal direction Y. This point will be clarified later by explaining the detailed configuration and operation of the color printing unit 32.

The drying apparatus 4 dries the inks adhering to the surface M1 of the printing medium M being conveyed from the printing apparatus 3. The drying apparatus 4 includes a housing 41 (drying furnace). Further, in the housing 41, rollers 42, 43 and 46 are arranged on a (+X) side and air turn bars 44, 45 are arranged on a (−X) side. By this arrangement, a substantially S-shaped conveyance path when viewed from a (+Y) side is configured, and the printing medium M is conveyed along this conveyance path. The inks adhering to the surface M1 of the printing medium M are dried during this conveyance. Then, the printing medium M subjected to the drying process is carried out from the drying apparatus 4 and wound on the winding roll 12.

Figure 2:
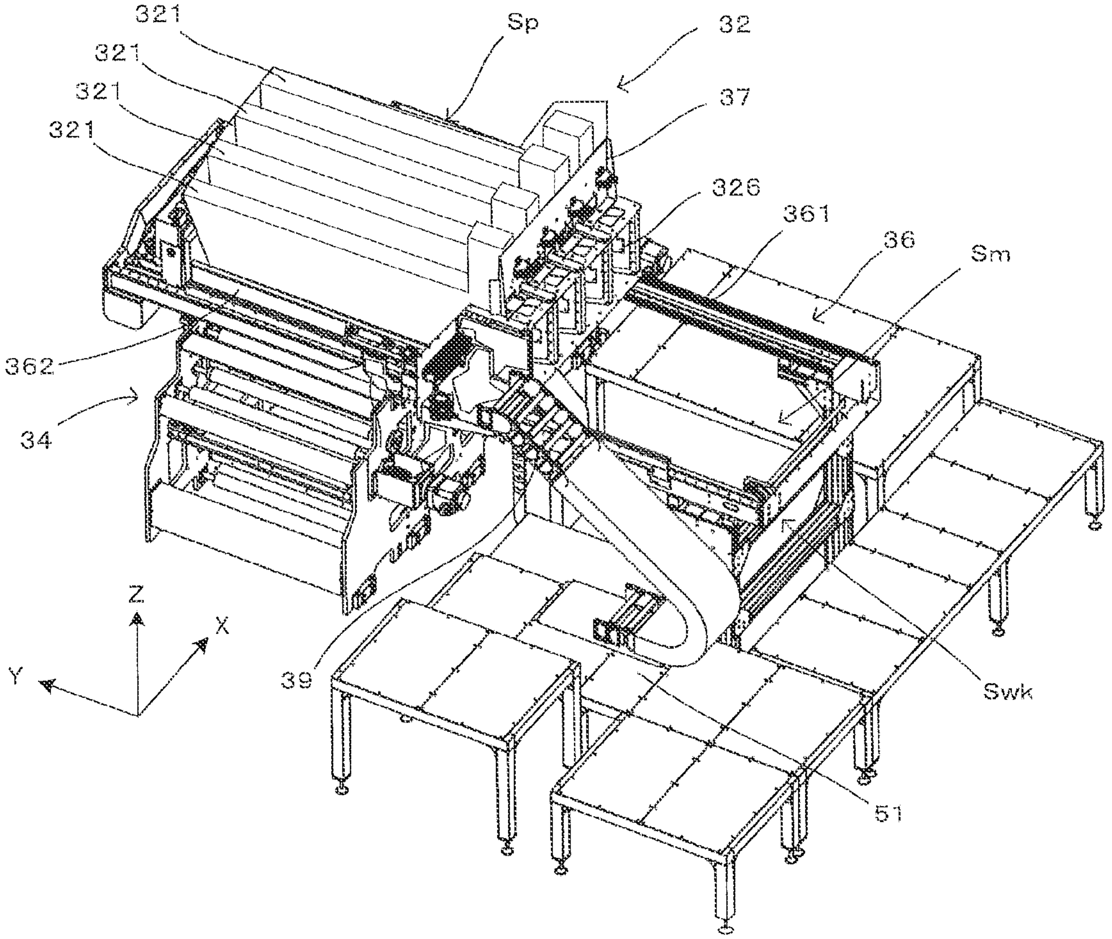
FIG. 2 is a perspective view of the color printer, which is one embodiment of the printing apparatus of the invention, when viewed from the (−X) direction.
Figure 3:
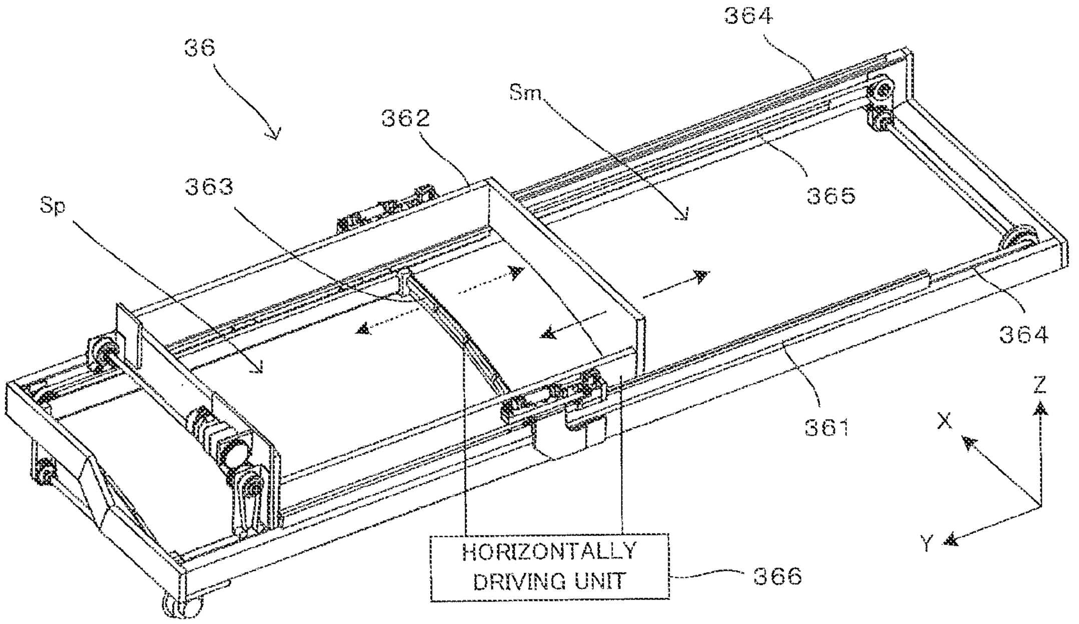
FIG. 3 is a view showing a horizontally moving mechanism equipped in the color printer of FIG. 2.

Next, the configuration and operation of the color printer 32 are described. FIG. 2 is a perspective view of the color printer, which is one embodiment of the printing apparatus of the invention, when viewed from the (−X) direction. Further, FIG. 3 is a view showing a horizontally moving mechanism equipped in the color printer of FIG. 2. Note that the horizontally moving mechanism 36 is shown in FIG. 3 with the printing bar units 321 and the color maintenance unit removed to clearly show the structure of the horizontally moving mechanism 36.

The horizontally moving mechanism 36 includes a body frame 361, a head mounting frame 362 for mounting the plurality of printing bar units 321 constituting the color printer 32, and a maintenance mounting frame 363 for mounting the color maintenance unit. As shown in FIG. 3, the body frame 361 has a frame body structure extending in the Y direction in a plan viewed from vertically above, and extends from a printing space Sp above the printing medium M to a maintenance space Sm separated in the (−Y) direction. Further, the body frame 361 is open vertically upward and downward. In the Y direction, the body frame 361 extends to be longer than the sum of a length of the head mounting frame 362 and that of the maintenance mounting frame 363. Head guide rails 364, 364 extending in the Y direction are respectively mounted on upper end surfaces on a (+X) side and a (−X) side of the upper surface of the body frame 361. As shown by solid-line arrows in FIG. 3, the head mounting frame 362 is provided movably in the Y direction along these head guide rails 364, 364. Further, maintenance guide rails 365, 365 extending in the Y direction are respectively mounted on inner side surfaces on the (+X) side and (−X) side of the body frame 361. As shown by dotted-line arrows in FIG. 3, the maintenance mounting frame 363 is provided movably in the Y direction along these maintenance guide rails 365, 365 below the head mounting frame 362.

In the horizontally moving mechanism 36, a horizontally driving unit 366 is provided to drive the head mounting frame 362 and the maintenance mounting frame 363. The horizontally driving unit 366 alternatively moves one of the head mounting frame 362 and the maintenance mounting frame 363 in the Y direction in response to a command from the controller 9 for controlling the entire printing system 1. For example, the maintenance mounting frame 363 is selectively moved in the Y direction. In this way, the maintenance mounting frame 363 mounting the color maintenance unit is reciprocated between the printing space Sp above the printing medium M and the maintenance space Sm separated from the printing space Sp in the (−Y) direction. This point is shown in detail in FIG. 6 to be described later. On the other hand, by selectively moving the head mounting frame 362 in the Y direction, the head mounting frame 362 is reciprocated between the printing space Sp and the maintenance space Sm while mounting the plurality of (four in this embodiment) printing bar units 321 as described next.

Figure 4:
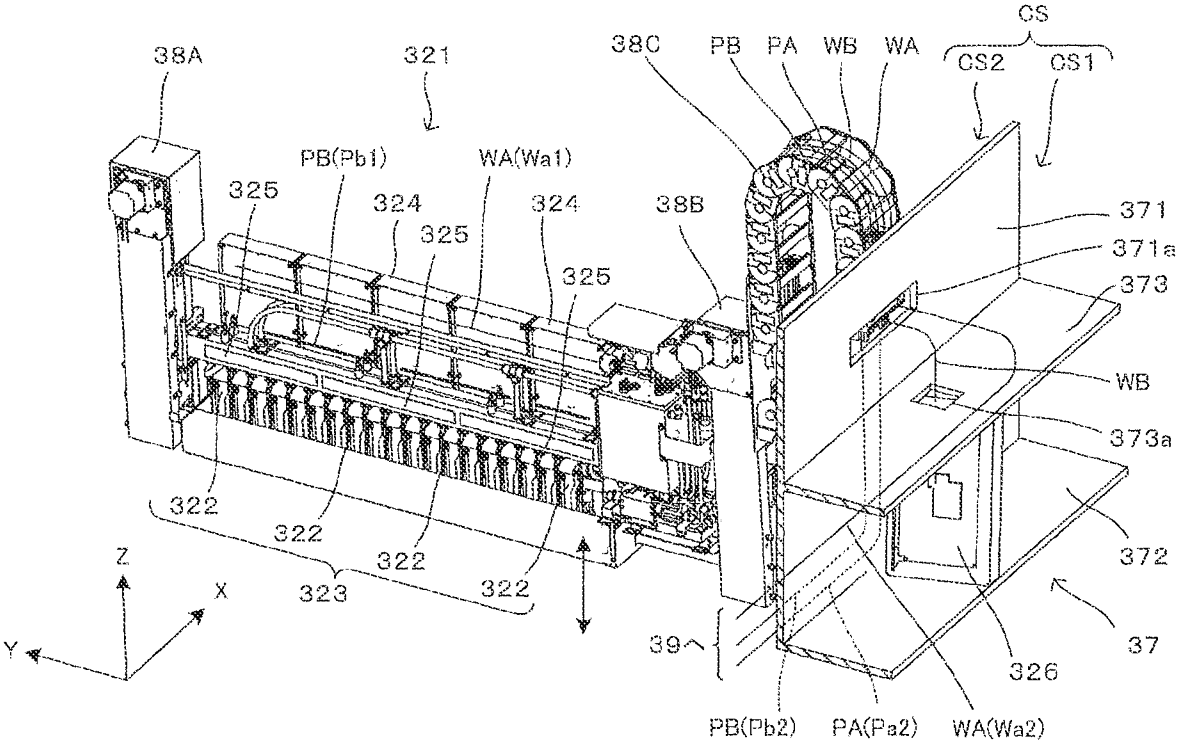
FIG. 4 is a perspective view showing the configuration of the printing bar unit.
Figure 5:
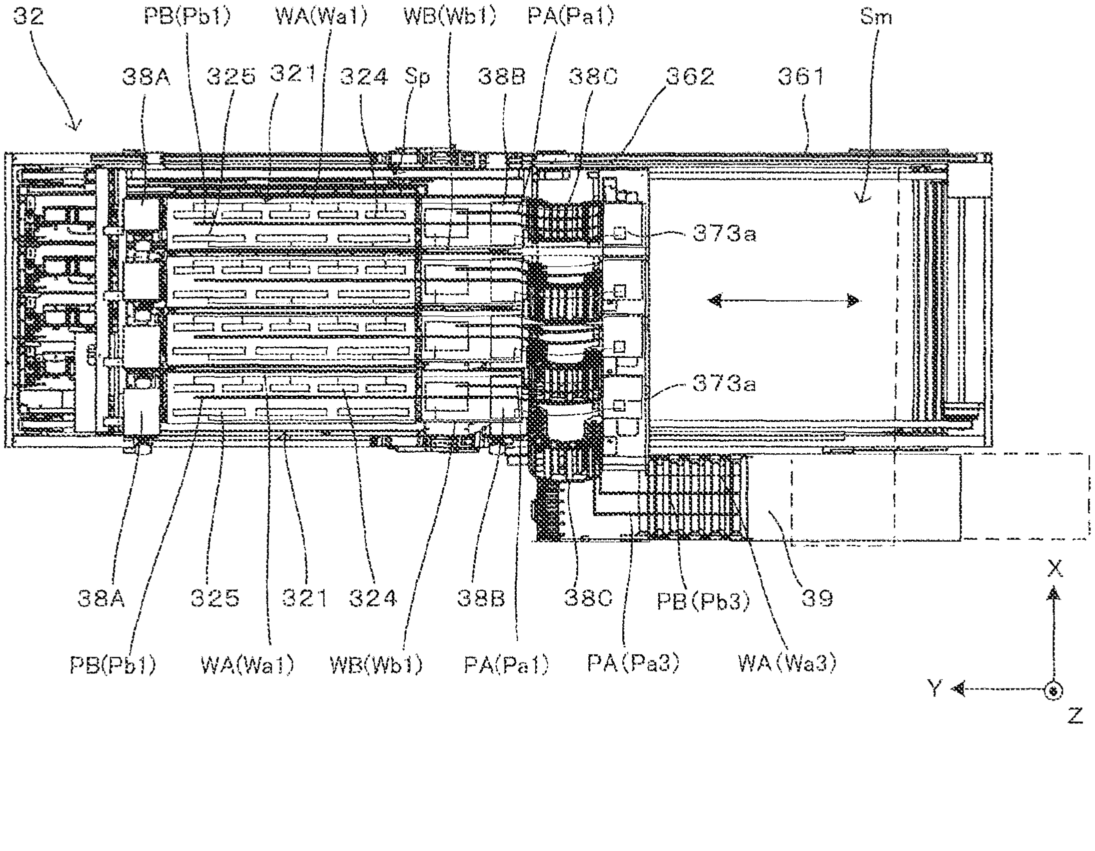
FIG. 5 is a plan view schematically showing a layout state of pipes and wires connected to the printing bar units.

FIG. 4 is a perspective view showing the configuration of the printing bar unit, and FIG. 5 is a plan view schematically showing a layout state of pipes and wires connected to the printing bar units. In this embodiment, as shown in FIGS. 2 and 4, four printing bar units 321 are arrayed adjacently in the X direction. Each printing bar unit 321 includes a printing bar 323 on which a plurality of discharge heads 322 for discharging the ink from the lower surfaces (discharging surfaces) are arrayed in the Y direction. The printing bar unit 321 is connected to an ink supply mechanism (not shown) by an ink piping system PA in which a plurality of ink pipes are bundled. A circulation pump (not shown) provided in this printing bar unit 321 operates in response to an electrical signal fed from a circulation temperature adjustment control board 326 (FIG. 4) via a circulation wire included in a circulation temperature adjustment wiring system WB, whereby the ink is supplied to the discharge heads 322 while being circulated between the printing bar unit 321 and the ink supply mechanism.

The circulation temperature adjustment control board 326 is also connected to a heater 325 via the circulation temperature adjustment wiring system WB. The circulation temperature adjustment control board 326 feeds a control signal to the heater 325 via a temperature adjustment wire included in the circulation temperature adjustment wiring system WB to stabilize the temperature of the ink to be supplied to the discharge heads 322. That is, the heater 325 adjusts the temperature of the ink to a temperature suitable for the printing process in response to the control signal. Further, together with the ink temperature adjustment, an ink circulation speed and the like are optimized by the circulation temperature adjustment control board 326 feeding a control signal to the circulation pump via the circulation wire.

As shown in FIGS. 2 and 4, this circulation temperature adjustment control board 326 is mounted on a partitioning member 37 arranged on (−Y) sides of the four printing bars 323. This partitioning member 37 includes a wall part 371 standing in the vertical direction and two shelf parts 372, 373 horizontally laid in the (−Y) direction with respect to the wall part 371. The shelf part 372 is located below the shelf part 373 and coupled to the head mounting frame 362. The circulation temperature adjustment control board 326 is disposed for each printing bar 323 between the shelf parts 372 and 373. Further, a connection space CS extending in the X direction on another end part (−Y side end part) of the head mounting frame 362 is divided into a (−Y) side space CS1 and a (+Y) side space CS2 by the wall part 371 of the partitioning member 37 as shown in FIG. 4.

Further, in each printing bar unit 321, a printed board 324 is arranged near the discharge heads 322, besides the circulation temperature adjustment control board 326, and is connected to the discharge heads 322. The printed board 324 is connected to the controller 9 via a printed board wiring system WA in which a plurality of wires are bundled, and controls the discharge heads 322 in response to an electrical signal fed via the wires. In this way, the ink is discharged in the form of liquid droplets from the lower surfaces (discharging surfaces) of the discharge heads 322 and printed on the printing medium M.

Each printing bar unit 321 is connected via a refrigerant piping system PB composed of a plurality of refrigerant pipes to cool the printed board 324 by cooling water (refrigerant), and the cooling water is circulated near the printed board 324. In this way, the thermal runaway of electronic circuits and the like mounted on the printed board 324 is effectively prevented. Note that the type of the refrigerant is not limited to the cooling water and another refrigerant can be used.

In the color printer 32 thus configured, elevating mechanisms 38A, 38B are provided in each printing bar unit 321 to individually elevate and lower the four printing bars 323 in the vertical direction. More particularly, as shown in FIG. 4, the elevating mechanism 38A is provided on the (+Y) side of the printing bar 323 and the elevating mechanism 38B is provided on the (−Y) side of the printing bar 323. The elevating mechanisms 38A, 38B operate in synchronization in response to an elevation command from the controller 9, whereby the printing bar 323 can be stably elevated and lowered. Further, a cable bear (registered trademark) 38C is arranged near the elevating mechanism 38B to guide the ink piping system PA, the refrigerant piping system PB, the printed board wiring system WA and the circulation temperature adjustment wiring system WB connected to the printing bar unit 321 in the vertical direction while storing and protecting these systems. Printing bar side end parts of the pipes constituting the ink piping system PA and the refrigerant piping system PB (hereinafter, respectively referred to as "pipe end parts Pa1" and "pipe end parts Pb2") and printing bar side end parts of the wires constituting the printed board wiring system WA and the circulation temperature adjustment wiring system WB (hereinafter, respectively referred to as "wire end parts Wa1" and "wire end parts Wb2") extend from a (+Y) side end part of the cable bear 38C toward the printing bar 323. As shown in FIG. 4, the wire end parts Wa1 are located at a position higher than the pipe end parts Pb1. Thus, if a liquid component (cooling water) leaks out from the pipe end parts Pb1, the occurrence of a short circuit in the wire end parts Wa1 due to this liquid component can be effectively prevented.

On the other hand, the pipes and wires extending from a (−Y) side end part of the cable bear 38C are respectively laid in different routes. That is, as shown in FIG. 4, the pipes constituting the ink piping system PA and the refrigerant piping system PB extend in the (−X) direction on a (+Y) side of the wall part 371. In contrast, the wires constituting the printed board wiring system WA and the circulation temperature adjustment wiring system WB extend in two separate directions after being pulled out upwardly of the shelf part 373 via a through hole 371*a* provided in the wall part 371. More particularly, the circulation temperature adjustment wiring system WB is extended and connected to the circulation temperature adjustment control board 326 via a through hole 373*a* provided in the shelf part 373. In contrast, the wires of the printed board wiring system WA are extended in the (−X) direction along the upper surface of the shelf part 373. That is, intermediate parts (hereinafter, referred to as "wire intermediate parts Wa2") along the upper surface of the shelf part 373, out of the wires of the printed board wiring system WA, are arranged in the (−Y) side space CS1, whereas intermediate parts (hereinafter, respectively referred to as "pipe intermediate parts Pa2" and "pipe intermediate parts Pb2") along the wall part 371, out of the pipes constituting the ink piping system PA and the refrigerant piping system PB, are arranged in the (+Y) side space CS2. In this way, the wiring system and the piping systems are partitioned by the partitioning member 37. Thus, even if the liquid component (ink, cooling water) leaks out from the pipe intermediate parts Pa2, Pb2, the occurrence of a short circuit in the wire intermediate parts Wb2 due to this liquid component can be effectively prevented. This point also applies to the wires constituting the circulation temperature adjustment wiring system WB.

On a (−X) side of the partitioning member 37, opposite printing bar side end parts (hereinafter, respectively referred to as "pipe end parts Pa3" and "pipe end parts Pb3") of the ink piping system PA and the refrigerant piping system PB and opposite printing bar side end parts (hereinafter, referred to as "wire end parts Wa3") of the printed board wiring system WA extend as shown in FIG. 5. These pipe end parts Pa3, Pb3 and wire end parts Wa3 are respectively extended to the ink supply mechanism, a cooling water supply mechanism and the controller 9 while being guided by a cable bear 39 arranged outside the body frame 361, more particularly arranged on the (−X) side. As shown in FIG. 2, a lower end part (one end part) of this cable bear 39 is fixedly arranged on a maintenance step 51 arranged on a (−X) side of a work space Swk to be described later. On the other hand, as shown in FIGS. 2 and 5, an upper end part (another end part) of the cable bear 39 is connected to a right-lower corner of the head mounting frame 362. The pipe end parts Pa3, Pb3 and the wire end parts Wa3 extended toward the (−X) side from the partitioning member 37 are stored in a storage space of this cable bear 39. Thus, also when the four printing bar units 321 are collectively moved in the Y direction according to a printing standby, a printing process and a maintenance operation to be described next, the pipe end parts Pa3, Pb3 and the wire end parts Wa3 are guided in the Y direction while being protected by the cable bear 39.

Figure 6:
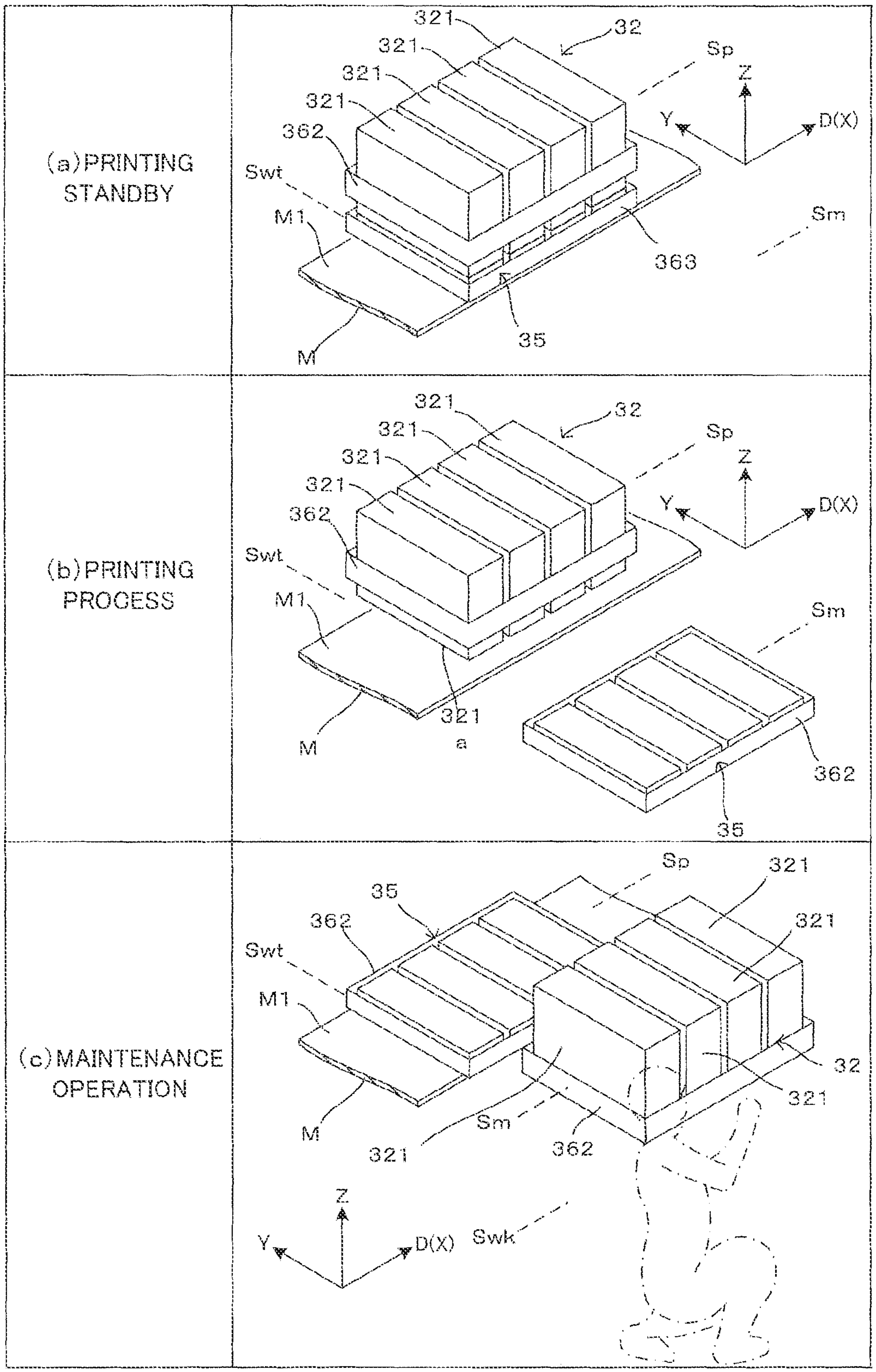
FIG. 6 is a chart showing the positions of the color printer and the color maintenance unit at the time of the printing standby, printing and maintenance by the operator.

FIG. 6 is a chart showing the positions of the color printer and the color maintenance unit at the time of the printing standby, printing and maintenance by the operator. In FIG. 6, reference sign D denotes the conveying direction of the printing medium M and substantially coincides with the (+X) direction. Further, as described later, an elevating direction of the printing bar unit 321, i.e. the vertical direction, also substantially coincides with the Z direction.

In the printing standby before the printing process, after the horizontally driving unit 366 moves the head mounting frame 362 to the printing space Sp in response to a movement command from the controller 9 as shown in field (a) of FIG. 6, the maintenance mounting frame 363 is moved to a standby space Swt. This standby space Swt means a space between the printing space Sp and the printing medium M as shown in FIG. 2. Of course, it goes without saying that movement timings of the head mounting frame 362 and the maintenance mounting frame 363 may be switched.

By the movement of the head mounting frame 362, the four printing bars 323 are collectively moved to and positioned above the printing medium M. Further, the color maintenance unit 35 is moved to and positioned between the printing medium M and the printing bars 323. In this way, the color maintenance unit 35 faces the lower surfaces (discharging surfaces) of the discharge heads 322. Further, when a capping process is performed during the printing standby, some or all of the pairs of elevating mechanisms (elevating mechanisms 38A, 38B) provided for the respective printing bar units 321 respectively independently position the printing bar 323 to be capped at a CAP position. Also when a cleaning process is performed, the printing bar 323 to be cleaned is positioned at a cleaning position by the individual elevation of the printing bar 323 by the elevating mechanisms 38A, 38B.

When the printing process is performed by an electrical signal fed from the controller 9 to the printed board 324 via the printed board wiring system WA, the color maintenance unit 35 is moved from the standby space Swt to the maintenance space Sm by the horizontally driving unit 366 as shown in field (b) of FIG. 6. Thereafter, the printing bars 323 are lowered to a printing position by the elevating mechanisms 38A, 38B. In this way, an interval between the discharging surfaces of the discharge heads 322 equipped in the printing bars 323 and the front surface M1 of the printing medium M is adjusted to a value suitable for inkjet printing. After this interval adjustment is completed, the inks having mutually different colors are discharged to the front surface M1 of the printing medium M being conveyed in the conveying direction D from the discharging surfaces of the respective printing bars 323 while the above interval is maintained. As a result, a color image is formed on the printing medium M (printing process).

In the printing apparatus 3, it may become necessary for the operator to perform maintenance (hereinafter, referred to as "operator maintenance") by directly accessing the discharging surfaces of the discharge heads 322 due to a factor such as an excess of a cumulative time of the printing process beyond a certain time or the occurrence of a trouble during the printing process or printing standby. In this case, the controller 9 moves the color printer 32 to the maintenance space Sm by automatically detecting the operator maintenance or receiving an operator maintenance command by the operator via a display operation unit (not shown). That is, as shown in field (c) of FIG. 6, the horizontally driving unit 366 moves the head mounting frame 362 to the maintenance space Sm. At this time, if the color maintenance unit 35 is located in the standby space Sm, the color maintenance unit 35 is moved to the standby space Swt by the horizontally driving unit 366. In this way, only the color printer 32 is positioned in the maintenance space Sm and the lower surfaces of the respective discharge heads 322 are largely exposed toward the work space Swk located below the maintenance space Sm. Accordingly, the operator enters the work space Swk to perform a maintenance operation as shown by one-dot chain lines in FIG. 6.

As described above, in this embodiment, the pipe end parts Pa3 of the ink piping system Pa, the pipe end parts Pb3 of the refrigerant piping system Pb and the wire end parts Wa3 of the printed board wiring system WA connected to the printing bar unit 321 are guided in the Y direction outside the body frame 361 while being protected by the cable bear 39. These are not present inside the body frame 361, i.e. in the work space Swk. As a result, as shown in field (c) of FIG. 6, the work space Swk can be easily and reliably secured only by collectively moving the printing bar units 321 to the maintenance space.

Further, as described above, the head mounting frame 362 mounting the printing bar units 321 is moved in the Y direction while the pipe end parts Pa3, Pb3 and the wire end parts Wa3 are protected by the cable bear 39. Thus, the breakage of the pipe end parts Pa3, Pb3 and the wire end parts Wa3 can be reliably prevented during the collective movements of the printing bar units 321.

Further, in the color printer 32, the printing bar units 321 used to print the color image on the printing medium M are collectively moved between the printing space Sp and the maintenance space Sm. Therefore, mechanisms for horizontally moving the printing bar units 321 can be unified and the apparatus configuration can be simplified.

Further, the four printing bar units 321 are arranged adjacently in the conveying direction D (X) by the collective movements of the printing bar units 321. Thus, intervals between the printing bar units 321 adjacent to each other can be narrowed and a color image can be printed with high quality. That is, if intervals between the discharge heads are widened as in a conventional apparatus, ink positions shot on the front surface M1 of the printing medium M from the discharge heads 322 may be shifted from designed positions in the conveying direction D or a width direction of the printing medium M depending on a conveying state (fluttering, skew, etc.) of the printing medium M being conveyed in the color printer 32. In contrast, since the mutual intervals between the printing bar units 321 are narrow and printing positions concentrate in the conveying direction D, printing is less likely to be affected by the conveying state and the ink of each color can be shot at a designed position. As a result, the quality of the color image can be enhanced.

As described above, the four printing bar units 321 have the same configuration and are arranged adjacently in the Y direction. Accordingly, out of two printing bar units 321 adjacent to each other, one corresponds to an example of a "first printing bar unit" of the invention, the printed board provided in this printing bar unit 321 corresponds to an example of a "first printed board" of the invention, the wires of the printed board wiring system WA connected to this printing bar unit 321 and the wire intermediate parts Wa2 of these wires correspond to examples of a "first wire" and a "first wire intermediate part" of the invention, the pipes of the ink piping system PA and the refrigerant piping system PB respectively correspond to examples of a "first ink pipe" and a "first refrigerant pipe" of the invention, and the pipe intermediate parts Pa2, Pb2 of these pipes respectively correspond to examples of a "first ink pipe intermediate part" and a "first refrigerant pipe intermediate part" of the invention. Further, the other printing bar unit 321 corresponds to an example of a "second printing bar unit" of the invention, the printed board provided in this printing bar unit 321 corresponds to an example of a "second printed board" of the invention, the wires of the printed board wiring system WA connected to this printing bar unit 321 and the wire intermediate parts Wa2 of these wires correspond to examples of a "second wire" and a "second wire intermediate part" of the invention, the pipes of the ink piping system PA and the refrigerant piping system PB respectively correspond to examples of a "second ink pipe" and a "second refrigerant pipe" of the invention, and the pipe intermediate parts Pa2, Pb2 of these pipes respectively correspond to examples of a "second ink pipe intermediate part" and a "second refrigerant pipe intermediate part" of the invention. Further, the (−Y) side space CS1 and (+Y) side space CS2 respectively correspond to examples of a "first space" and a "second space" of the invention. Further, the X direction and Y direction correspond to examples of a "first horizontal direction" and a "second horizontal direction" of the invention. Furthermore, the cable bear 39 corresponds to an example of a "protecting/guiding member" of the invention.

Note that the invention is not limited to the embodiment described above and various changes other than the aforementioned ones can be made without departing from the gist of the invention. For example, although the color printer 32 includes the four printing bar units 321 in the above embodiment, the number of the printing bar units 321 is not limited to four and may be two, three, five or more.

Further, although the invention is applied to the color printer 32 in the above embodiment, the invention may be applied to the white printer 33.

This invention is applicable to printing techniques in general for printing an image by discharging inks different from each other to a printing medium from a plurality of printing bar units arrayed adjacently and maintenance techniques in general for maintaining the printing bar units.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A printing apparatus, comprising:

a first printing bar unit configured to, based on an electrical signal fed via a first wire, discharge a first ink supplied via a first ink pipe to a printing medium being conveyed in a first horizontal direction;

a second printing bar unit arranged adjacent to the first printing bar unit in a direction parallel to the first horizontal direction and configured to, based on an electrical signal fed via a second wire, discharge a second ink supplied via a second ink pipe to the printing medium;

a body frame, having a frame body structure extending to a maintenance space separated from a printing space above the printing medium in a second horizontal direction different from the first horizontal direction, configured to support the first and second printing bar units collectively movably between the printing space and the maintenance space;

a protecting/guiding member for guiding the first wire and the first ink pipe connected to the first printing bar unit and the second wire and the second ink pipe connected to the second printing bar unit in parallel to the second horizontal direction according to movements of the first and second printing bar units while storing and protecting the first and second wires and the first and second ink pipes in a storage space; and a head mounting frame provided movably in parallel to the second horizontal direction with respect to the body frame while mounting the first and second printing bar units, wherein the protecting/guiding member is arranged outside and adjacent to the body frame, whereby a work space is formed below the first and second printing bar units located in the maintenance space inside the body frame and first and second printing bar units are accessible through the work space, wherein one end part of the protecting/guiding member is fixedly arranged, whereas another end part is coupled to one end part of the head mounting frame in the first horizontal direction and moves according to movements of the first printing bar unit, the second printing bar unit and the head mounting frame, wherein the printing apparatus further comprises a partitioning member configured to partition a connection space extending from the other end part of the protecting/guiding member to another end part of the head mounting frame into a first space and a second space, wherein a first wire intermediate part extending from the other end part of the protecting/guiding member to the first printing bar unit, out of the first wire, and a second wire intermediate part extending from the other end part of the protecting/guiding member to the second printing bar unit, out of the second wire, are arranged in the first space; and wherein a first ink pipe intermediate part extending from the other end part of the protecting/guiding member to the first printing bar unit, out of the first ink pipe, and a second ink pipe intermediate part extending from the other end part of the protecting/guiding member to the second printing bar unit, out of the second ink pipe, are arranged in the second space.

2. The printing apparatus according to claim 1, wherein:

the first printing bar unit includes a first printed board configured to control discharge of the first ink based on an electrical signal fed via the first wire while being cooled by a refrigerant supplied via a first refrigerant pipe, the second printing bar unit includes a second printed board configured to control discharge of the second ink based on an electrical signal fed via the second wire while being cooled by a refrigerant supplied via a second refrigerant pipe, the first wire is arranged at a position higher than the first refrigerant pipe in the first printing bar unit, and the second wire is arranged at a position higher than the second refrigerant pipe in the second printing bar unit.

3. The printing apparatus according to claim 2, wherein:

the protecting/guiding member guides the first refrigerant pipe connected to the first printing bar unit and the second refrigerant pipe connected to the second printing bar unit in parallel to the second horizontal direction according to movements of the first and second printing bar units while storing and protecting the first and second refrigerant pipes in the storage space.

4. The printing apparatus according to claim 3, wherein:

a first refrigerant pipe intermediate part extending from the other end part of the protecting/guiding member to the first printing bar unit, out of the first refrigerant pipe, and a second refrigerant pipe intermediate part extending from the other end part of the protecting/guiding member to the second printing bar unit, out of the second refrigerant pipe, are arranged in the second space.

5. A head maintenance method in the printing apparatus according to claim 1, comprising:

collectively moving the first and second printing bar units to the maintenance space; and performing a maintenance operation by accessing at least one of the first and second printing bar units through the work space formed below the first and second printing bar units located in the maintenance space.

* * * * *